E. B. TURNIPSEED.
Improvement in Cotton-Choppers.
No. 114,889. Patented May 16, 1871.
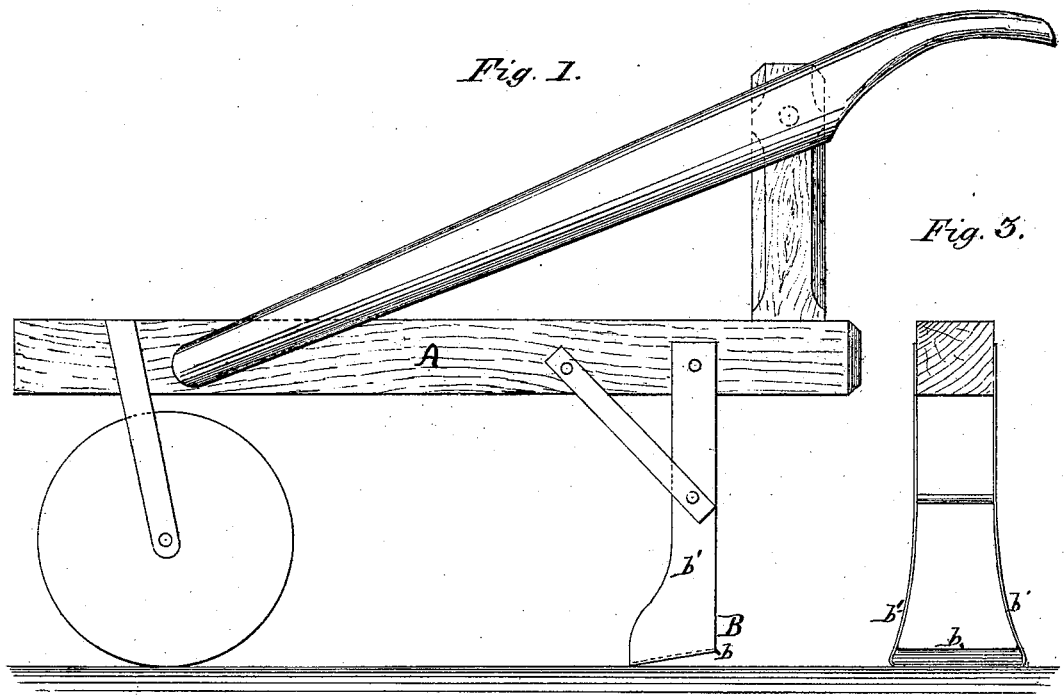
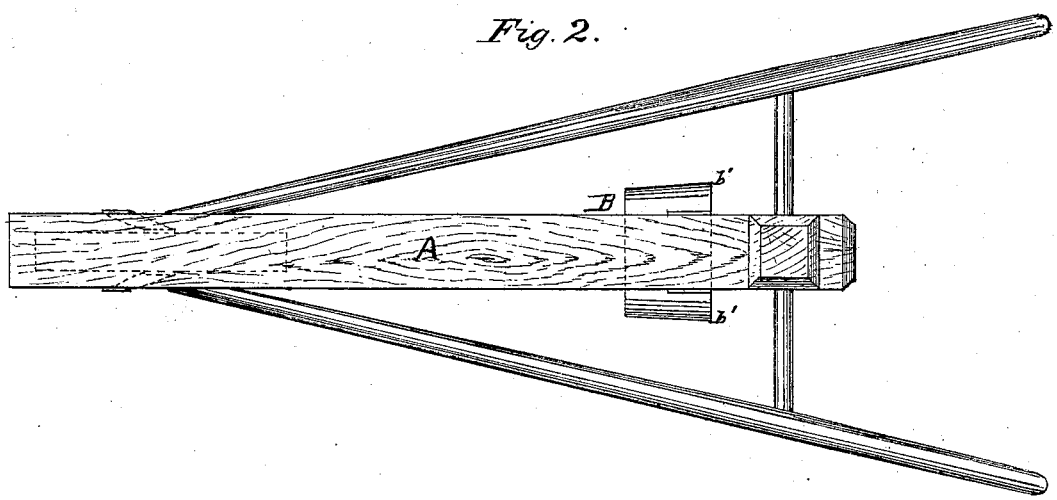
Witnesses:
S. J. Noyes.
D. H. Cowl
Inventor
E. B. Turnipseed by
H. W. Beadle, atty.

UNITED STATES PATENT OFFICE.

EDWARD BERRIAM TURNIPSEED, OF COLUMBIA, SOUTH CAROLINA.

IMPROVEMENT IN COTTON-CHOPPERS.

Specification forming part of Letters Patent No. 114,889, dated May 16, 1871.

*To all whom it may concern:*

Be it known that I, EDWARD BERRIAM TURNIPSEED, of Columbia, in the district of Richland and State of South Carolina, have invented a new and useful Improvement in Cotton-Choppers; and I do hereby declare that the following is a full and exact description of the same, reference being had to the accompanying drawing, and to the letters of reference marked thereon.

This invention relates to that class of cultivating-implements which is especially designed for chopping out cotton; and consists in the specific construction of the cutter or blade, as will be fully described hereinafter.

In the drawing, Figure 1 represents a side elevation of a machine having my improved cutter attached; Fig. 2, a plan view of the same: and Fig. 3, a front elevation of the cutter detached.

To enable others skilled in the art to make and use my invention, I will now proceed to describe fully its construction and operation.

B represents the cutter, which is suitably attached to the beam A in any proper manner. It consists of two side pieces, $b'$, united to a bottom piece, $b$, as shown. The side pieces have their front edges curved, as shown in Fig. 1, to facilitate the operation of cutting, and they also incline outward laterally from each other as they extend downward, as shown in Fig. 3. Their rear edges are also more widely separated from each other than the front edges—that is, the cutter inclines outward from front to rear. The bottom part $b$ of the cutter B also inclines upward from front to rear.

From this description it will be observed that the cutter has four peculiarities of construction: first, its front edges are curved; second, its sides expand laterally as they approach the bottom plate; third, the cutter, as a whole, is inclined outwardly from front to rear; fourth, the bottom plate is inclined upward, while the sides are at right angles to the beam.

These peculiarities of construction are adapted for specific purposes. The curved cutting-edges in front are adapted to cut with a drawing movement as the plants slip over them. The expanded sides below permit the cutter to take up all the plants that it reaches without disturbing the adjacent ones. Its rearwardly tapering form permits the ready discharge of the plants and earth which it operates upon. The inclined bottom blade slightly lifts the earth and plants without carrying them along with it; and, furthermore, the machine itself is not drawn down into the earth by the operation of the cutter.

I do not claim the separate features of construction in themselves; but

Having thus fully described my invention, what I claim as new, and desire to secure by Letters Patent, is—

The combination of the cutter B, constructed as described, with curving front edges, laterally-expanding sides, rearwardly-tapering form, and inclined bottom blade, with the beam A, the parts being relatively arranged as described.

This specification signed and witnessed this 1st day of October, 1870.

EDWARD BERRIAM TURNIPSEED.

Witnesses:
 A. L. SOLOMON,
 W. H. ANDERSON.